A. A. MERRITT.
DRIVING CONNECTION FOR SEWING MACHINES.
APPLICATION FILED JAN. 28, 1910. RENEWED AUG. 1, 1912.

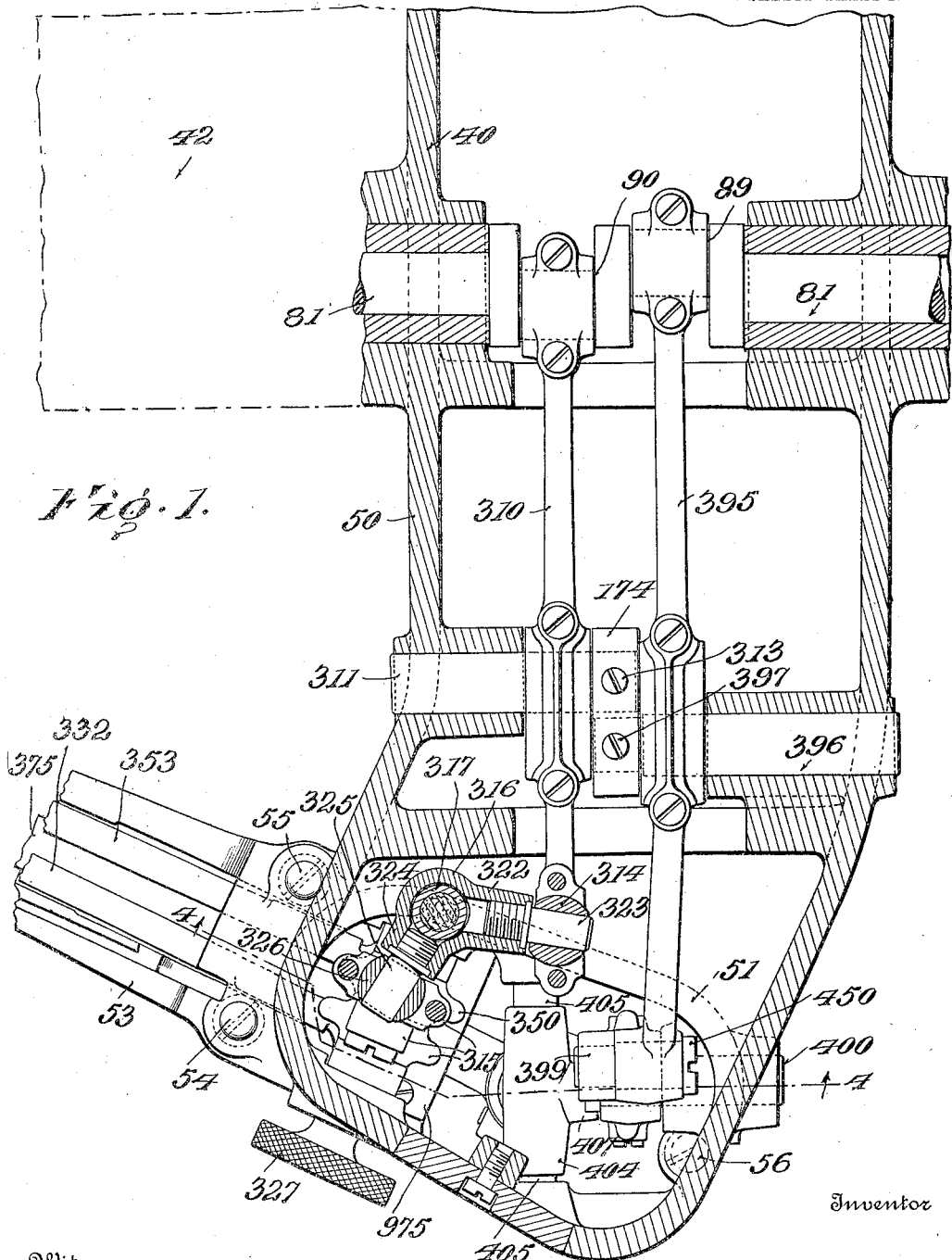

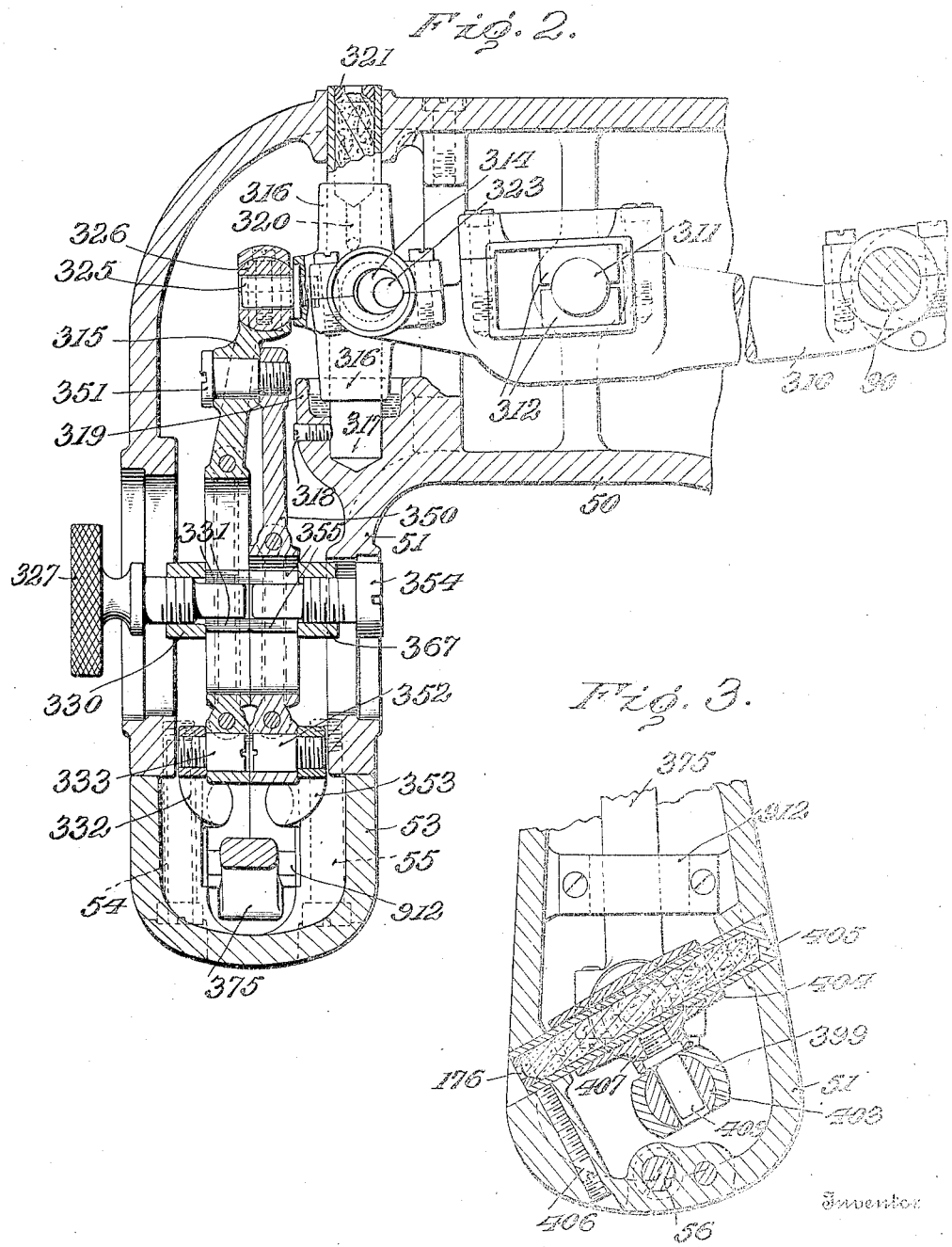

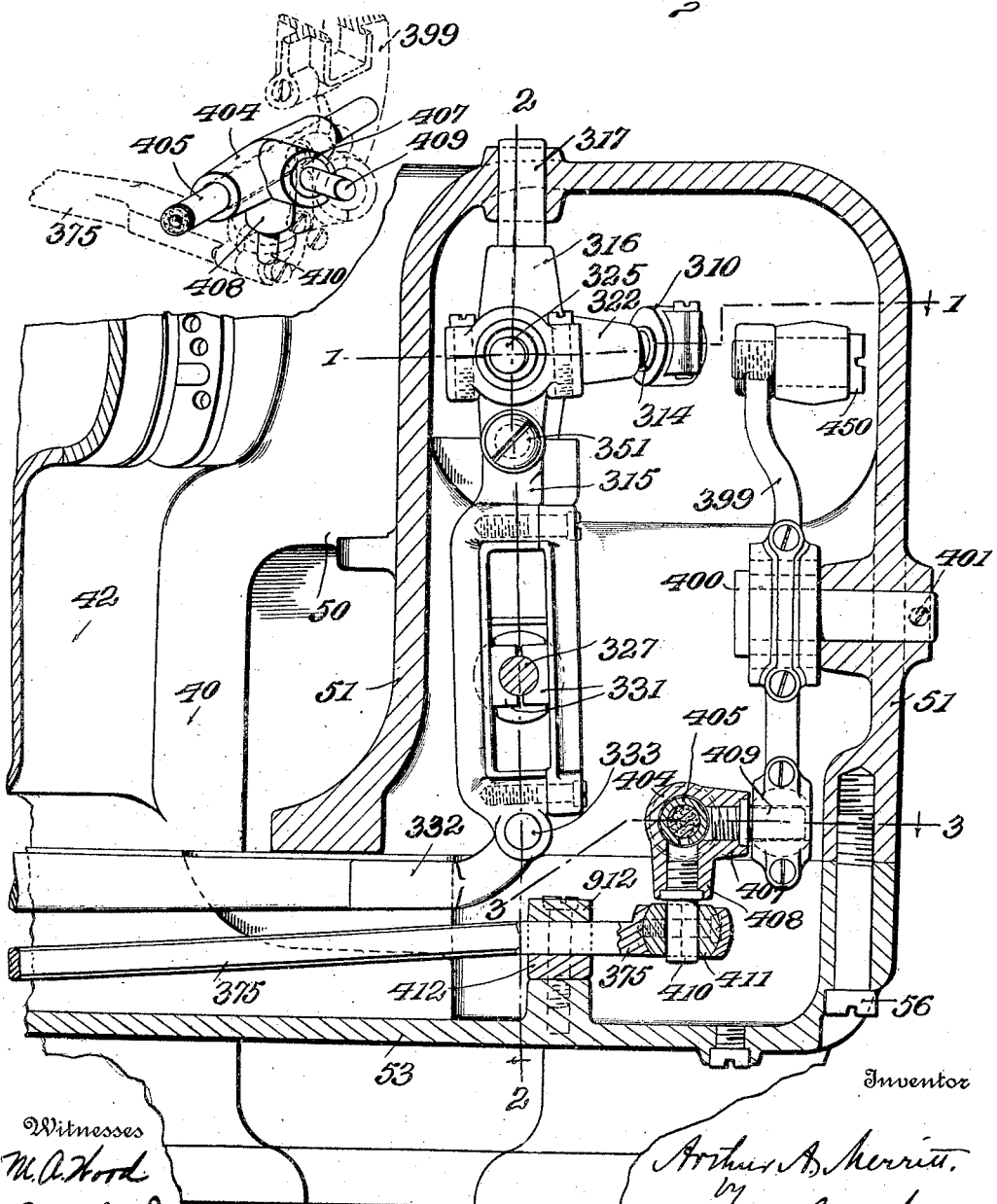

UNITED STATES PATENT OFFICE.

ARTHUR A. MERRITT, OF WORCESTER, MASSACHUSETTS, ASSIGNOR TO WILLCOX & GIBBS SEWING MACHINE COMPANY, OF NEW YORK, N. Y., A CORPORATION OF NEW YORK.

DRIVING CONNECTION FOR SEWING-MACHINES.

1,041,657.

Specification of Letters Patent.

Patented Oct. 15, 1912.

Original application filed December 12, 1908, Serial No. 467,163. Divided and this application filed January 28, 1910, Serial No. 540,599. Renewed August 1, 1912. Serial No. 712,777.

*To all whom it may concern:*

Be it known that I, ARTHUR A. MERRITT, of Worcester, Massachusetts, have invented a new and useful Improvement in Driving Connections for Sewing-Machines, which invention is fully set forth in the following specification.

This is a division of my application filed December 12th, 1908, Serial No. 467,163, for improvements in sewing machines.

The present invention, while relating generally to improvements in sewing machines, is directed particularly to driving connections especially designed and adapted for use in such machines, but also capable of use in other mechanisms.

This invention will be readily understood by reference to the illustration in the accompanying drawings of what is at present regarded as the preferred embodiment thereof in a sewing-machine of the character more fully illustrated and described in the aforesaid original application.

Figure 6:
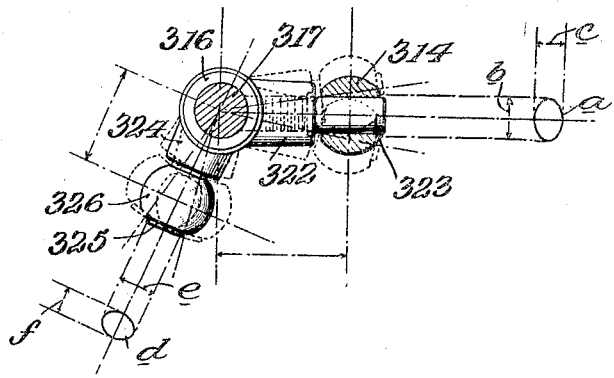
Figure 7:
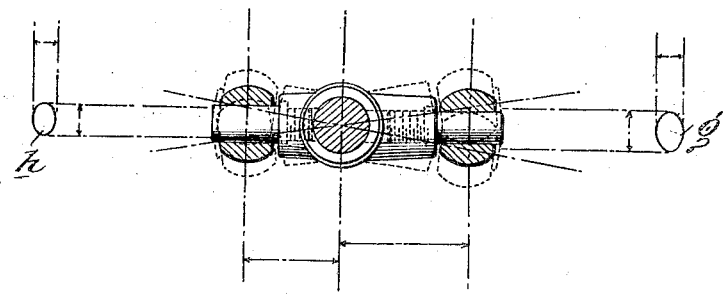
Figure 8:
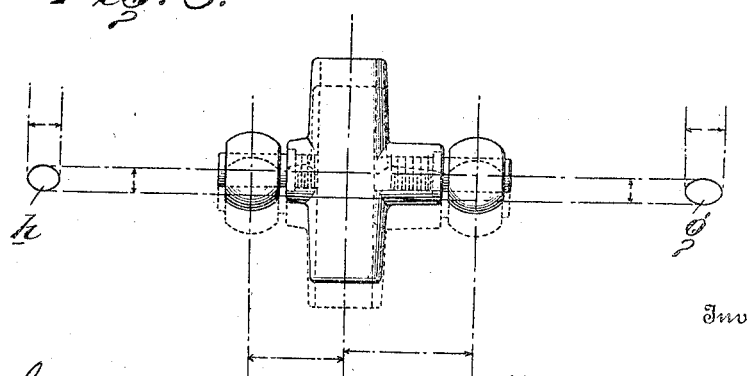

In said drawings: Figure 1 is a horizontal sectional view through a portion of the work-arm of the machine on line 1—1 of Fig. 4; Fig. 2 is a vertical section on the line 2—2 of Fig. 4; Fig. 3 is a horizontal section on line 3—3 of Fig. 4; Fig. 4 is a vertical section on the line 4—4 of Fig. 1, with certain of the parts through which said section line passes shown in elevation; Fig. 5 is a detail perspective of one of the couplings; Fig. 6 is a top view, with parts in section, of the coupling shown in Fig. 2; Fig. 7 is a top view, with parts in section, of a similar coupling in which the arms radiate in alinement or in parallelism to each other; and Fig. 8 is an elevation of the coupling shown in Fig. 7.

The framework of the machine comprises two hollow standards, only one of which 40 is shown, connected by a hollow bridge 42 (part of which is shown in Fig. 4, and in dotted lines Fig. 1), preferably formed in one casting. A hollow work-arm extends forward from the upper end of the standard 40 in a horizontal part 50, and from the outer end of the latter a part 51 depends vertically. These parts 50 and 51 are, as shown, preferably a continuation or extension of the hollow standard 40, being cast integral therewith and as a part of the single main casting which also embraces the bridge 42 and the other standard. A horizontal part 53 of the work-arm extends from the lower end of part 50 toward the left and rearward (Fig. 1), terminating at its free end—which constitutes the free end of the entire work-arm—beneath an overhanging portion of the head of the machine not shown. As illustrated, part 53 of the work-arm is preferably a trough-like casting secured to part 51 by screws 54, 55 and 56. The main driving shaft 81 (Fig. 1) has two cranks, one 89 for driving the parts through which the loopers of the machine are actuated, and the other 90 for driving the parts through which the feed is actuated.

310 is a pitman fulcrumed on a pin 311, and also movable longitudinally on said pin through the intermediary of bearing-blocks 312 working in a capped opening of the pitman. The inner end of the pin 311 is secured in a socket in a wall or flange 174 (clearly shown in Fig. 1) by a set-screw 313. A capped bearing at the inner end of pitman 310 embraces crank 90. A capped bearing at the outer end of the pitman embraces a spherical bearing 314 of a coupling device through which motion is transmitted to a vertical lever 315 extending longitudinally within the part 51 of the work-arm. The coupling referred to (see also Fig. 6) comprises a sleeve 316 embracing and vertically movable on a short shaft 317 extending through an opening in the top wall of the part 50 of the work-arm, its lower end being fixed by a set screw 318 in a socket in the lower wall of said part of the arm, as clearly shown in Fig. 2. An upwardly projecting flange 319 around said socket forms a cup for lubricant which lubricates the contacting surfaces of the lower end of sleeve 316 and the shaft 317. The upper end of shaft 317 is hollow, and from the lower end of the hollowed portion a passage 320 leads to the surface of the shaft, its outer end being preferably closed with a leather plug through which the lubricant exudes. The hollow portion of the shaft is preferably filled with a fibrous material, such as waste, held in position by a plug 321 at the outer end of the shaft, said plug having a central opening through which lubricant may be introduced to saturate the fibrous material. Sleeve 316 has two short arms projecting therefrom at an angle of approximately 115° with relation to each other, the arm 322 consisting of a part cast integral with the sleeve and a pin 323 screw-threaded into said part and at its outer end slidingly engaging in an opening through the spherical bearing 314 heretofore mentioned. The other short arm 324 on the sleeve also comprises a part cast integral with the sleeve and a pin 325 screw-threaded into a socket in said part and at its outer end slidingly engaging in an opening through a spherical bearing 326. The latter is embraced by a capped bearing at the upper end of the lever 315.

From the construction thus described, it will be readily understood that the slightly elliptical motion imparted to the outer end of pitman 310 acts upon the arm 322 (Fig. 1) of the coupling, causing the outer end of said arm to describe a similar slightly elliptical movement, during which the pin 323 has slight longitudinal movement in the opening in the spherical bearing 314, and the sleeve 316 slides up and down on the shaft 317. This elliptical movement of arm 322 is approximated in Fig. 6 by the ellipse marked $a$, the major axis of which, equal to the line $b$, represents the distance of movement in a horizontal direction, while the minor axis, equal to line $c$, represents the distance of movement in a vertical direction. The arm 324 of the coupling, which acts upon the upper end of the lever 315 (Fig. 2), describes an elliptical movement approximated in Fig. 6, by ellipse $d$, the major axis of which, equal to line $e$, represents the distance of horizontal movement imparted to the outer end of arm 324, and the minor axis of which, equal to line $f$, represents the distance of vertical movement. It will be seen that the minor axes of both ellipses, equal to lines $f$ and $c$, are of equal length, corresponding to the vertical sliding movement of the coupling on the shaft 317. On the other hand, the major axis, equal to line $b$, is longer than the major axis equal to line $e$, due to the fact that arm 324 is relatively shorter than the arm 322.

The dimensions of the coupling such as the length of the arms and their angular relationship, may be varied to fit different conditions and requirements of use. Instead of having the arms at an angle of approximately 115° as in Fig. 6, it may be desirable to position them at 180°, as in Figs. 7 and 8. The couplings being otherwise similar, the form of movement transmitted to the driven part will be the same, as indicated by a comparison of ellipses $a$ and $b$ of Fig. 6 with ellipses $g$ and $h$ of Figs. 7 and 8. A circular movement at the end of one arm will be transformed into an elliptical movement at the end of the other arm if the arms are of different lengths. Various other similar transformations of movement are possible. With arms of equal length, the movement will be similar at the end of both.

The lever 315 is fulcrumed to turn on the inner reduced end of the stem of a milled head 327, said stem passing through a slot in the front wall of the part 51 of the work-arm and having a screw-threaded portion engaging a nut 330. Through the intermediary of two bearing blocks 331 embracing the reduced end of the stem of the thumb-wheel, and working in an elongated capped bearing opening in the lever 315, the latter is free to move longitudinally during its rocking movement about its fulcrum. At its lower extremity this lever is pivoted to the upwardly bent end of a horizontal feed lever 332, this pivot consisting of a screw 333, the threaded end of which engages the lever 332 and the headed end of which engages an opening through the lever 315, as clearly shown. The feed lever 332 extends longitudinally within the horizontal part 53 of the work-arm, and at its forward end (not shown) is fulcrumed and carries a feed-surface. Through the connections explained this feed-surface is given what is known in the art as a four-motion feed describing a circle or ellipse. The extent of this feed movement, or what is known as the throw of the feed, may be adjusted to increase or decrease the same by loosening the thumb wheel 327 (Fig. 2), and moving the same, its stem and the bearing blocks 331, upward to increase the throw of the feed surface, and downward to decrease the same.

350, is an auxiliary lever pivoted at its upper end, by a screw pivot 351, to lever 315 and at its lower end pivoted by a screw pivot 352 (similar to screw pivot 333, heretofore described), to the upwardly bent end of a feed lever 353, which latter extends longitudinally within the horizontal part 53 of the work-arm parallel to the feed lever 332. Intermediate of its ends the lever 350 is fulcrumed to turn on the reduced end of the stem or shank of screw 354. The lever 350 is also longitudinally movable on its fulcrum through the intermediary of two bearing blocks 355 embracing the pivot end of the screw 354 and located in an elongated capped bearing slot in the lever 350. The stem or shank of the screw 354 passes through a vertical slot in the rear wall of the vertical part 51 of the work-arm, the head of the screw engaging the counter-sunk outer portion of said slot and bearing against an offset or shoulder formed around the slot by the counter-sinking. A screw-threaded portion of the stem of the screw engages a nut 367. By tightening the screw to draw the nut against the inner surface of the wall of the arm at the sides of the slot, the screw is secured in any position to which it may be adjusted. At its forward end, not shown, horizontal feed-lever 353 is fulcrumed and carries a feed surface.

From the construction described, it will be understood that the auxiliary lever 350 is rotated and moved longitudinally on its fulcrum, causing its lower end to describe an elliptical movement, which is in turn imparted to the upwardly bent end of the feed lever 353. This movement of the latter lever transmits to its forward end, to which the feed surface is attached, a circular or elliptical movement the outline of which may be varied by adjustment of the fulcrum pin 354 of lever 350.

The form of coupling described above for transmitting motion from the pitman 310 to the lever 315 is of special importance and adapted to a wide variety of uses, in that it enables rotary and other movements in a curved line to be transmitted between longitudinally movable levers, pitmen, or analogous parts, whose lines of action may be at different relative angles without the use of gears and shafts therefor. The movement thus transmitted may be of regular or irregular form, and the path described by one arm of the coupling may differ from that described by the other arm, depending upon the relative lengths of the arms. By the use of such coupling it is possible to dispense with beveled or analogous gearing in the use of which provision must be made for end thrust. Furthermore, the wear on the teeth of beveled gears produces slight lost motion, which in machines of the character herein described is seriously objectionable. Furthermore, beveled and analogous gearing are noisy, particularly when operating at high speed such as that at which machines herein described are adapted to be driven; the improved coupling described practically eliminates these objections.

A similar coupling constitutes a part of the driving connections for the loopers, which connections will now be described in detail. Pitman 395 has a capped bearing at one end embracing the crank 89, and near its middle is fulcrumed to turn on a pin 396 passing through the side wall of horizontal part 50 of the work-arm, and at its inner end secured by a set screw 397 in a socket in the wall of flange 174 heretofore mentioned. Through the intermediary of two bearing blocks (similar to 312) embracing pivot pin 396, and working in a capped elongated bearing opening in the pitman 395, the latter is also free to move longitudinally on its fulcrum. At its outer end pitman 395 is pivoted by screw bolt 450 to the upper end of a lever 399 extending vertically within the part 51 of the work-arm. Lever 399 is fulcrumed to turn on a headed pivot pin 400, the shank of which is secured by a set screw 401 (Fig. 4) in an opening in the wall of the part 51 of the work-arm. Through the intermediary of bearing blocks, not shown, but similar to 331, embracing pivot pin 400 and working in an elongated capped bearing opening in the lever 399, the latter is adapted to move longitudinally on its fulcrum. At its lower end the lever 399 is capped to embrace a spherical bearing block 403. Movement is communicated from the lower end of the lever 399 to the end of the looper lever 375, which latter extends longitudinally within the part 53 of the work-arm, as heretofore explained, through a coupling similar to the coupling heretofore described as transmitting motion from the pitman 310 to the lever 315. In the present instance the coupling comprises a sleeve 404 longitudinally movable on a short shaft or bar 405 supported at its opposite ends in openings through the side wall of the lower end of the part 51 of the work-arm and held in position by set-screw 406. The pin 405 is hollowed and filled with a fibrous material to be saturated with a lubricant for which an exit opening is provided through the side wall of the hollow pin. The open end of the pin is partly closed by a plug 176 having a central opening therein through which lubricant may be introduced to saturate the fibrous material. Two arms 407 and 408 project from the sleeve 404 approximately at right-angles with relation to each other, and are preferably cast integral with the sleeve; these arms include pins 409 and 410 screw-threaded at one end to engage sockets as shown. The pin 409 projects into a central opening through the spherical bearing 403. The pin 410 projects through a central opening through a similar spherical bearing 411, which latter is embraced by the capped end of the looper lever 375.

From this description it will be understood that the coupling serves to communicate the rotary movement of the lower end of lever 399 to the end of looper bar 375; the turning of the sleeve 404 of the coupling on its pin 405, causes the bearing pins 409 and 410 to have a slight end-wise movement in their openings through the spherical bearing blocks. In the lateral movement imparted to the end of the looper bar 375 through the coupling just described, said bar works in a space between guide-plate 412 and a bridge piece 912 extending transversely across the interior of the horizontal part 53 of the work-arm; undesirable vibration of the driven end of the looper bar is thus avoided. At its forward end, not shown, the looper-bar 375 is fulcrumed on a vertical pivot and carries the loopers.

What I claim is—

1. In a sewing machine, the combination with a work-arm having a bend or angle therein, of driving connections extending along said work-arm to an operating part and including a rotatable coupling located at the bend or angle of the arm and longitudinally movable on its axis of rotation, a driving member extending along the arm at one side of its bend or angle and connected to said coupling, actuating means for imparting longitudinal and lateral movement to said driving member and through said connection to the coupling turning the latter about and moving it longitudinally of its axis, and a driven member also connected to said coupling and extending along the work-arm at the other side of the bend or angle thereof.

2. In a sewing machine, the combination with a hollow work-arm having a bend or angle therein, of driving connections extending along said work-arm to an operating part and including a coupling within the arm at the bend or angle thereof, a shaft extending transversely within the arm and on which said coupling is rotatable and movable longitudinally of the shaft, a driving member extending longitudinally within the arm at one side of its bend or angle and connected to said coupling, actuating means for imparting longitudinal and lateral movement to said driving member and through said connection to the coupling turning the latter about and moving it longitudinally of its axis, and a driven member also connected to said coupling and extending within the work-arm at the other side of the bend or angle thereof.

3. In a sewing machine, the combination with a hollow work-arm having a bend or angle therein, of driving connections extending along said work-arm to an operating part and including a rotatable coupling within the arm at the bend or angle thereof, a driving lever extending longitudinally within the arm at one side of its bend or angle and connected to said coupling, actuating means for imparting longitudinal movement to said lever while rocking it on its fulcrum and through said connection of the lever to the coupling turning the latter about and moving it longitudinally of its axis, and a driven lever extending within the arm at the other side of its bend or angle and free to rock on its fulcrum while moving longitudinally.

4. In a sewing machine, the combination with a work-arm having a bend or angle therein, of driving connections extending along said work-arm to an operating part and including a coupling located at the bend or angle of the arm consisting of a rotatable member longitudinally movable on its axis of rotation, and having two arms branching therefrom in directions transverse to the axis of rotation, a driving lever or bar extending along the arm at one side of its bend or angle and connected to one arm of the coupling acting to impart rotary and longitudinal movement to the coupling, and a driven lever or bar connected to the other arm of the coupling and extending along the work-arm at the other side of its bend or angle.

5. Driving connections including a rotatable member longitudinally movable on its axis of rotation, a driving member connected to said rotatable member, actuating means for imparting longitudinal and lateral movement to said driving member and through its said connection to the rotatable member turning the latter about and moving it longitudinally of its axis, and a driven member also connected to said rotatable member.

6. Driving connections including a rotatable member longitudinally movable on its axis of rotation, a driving member connected to said rotatable member, actuating means imparting longitudinal movement in a curved path to said driving member at its point of connection to the rotatable member and thereby simultaneously turning the latter about and moving it longitudinally of its axis, and a driven member connected to said rotatable member.

7. Driving connections including a rotatable member longitudinally movable on its axis of rotation, a driving lever connected to said rotatable member, actuating means simultaneously rocking said driving lever on its fulcrum and moving it longitudinally and through said connection to the rotating member turning the latter about and moving it longitudinally of its axis, and a driven member also connected to said rotatable member.

8. Driving connections including a coupling consisting of a member rotatable on an axis and also movable along said axis longitudinally of the latter, said member having two arms branching therefrom in directions transverse to the axis of rotation, a driving lever or bar connected to one of said arms and acting to impart rotary and longitudinal movement to the coupling; and a driven lever or bar connected to the other arm.

9. Driving connections including a coupling consisting of a member rotatable on an axis and also movable along said axis longitudinally of the latter, said member having two arms of different length branching therefrom in directions transverse to the axis of rotation, a driving lever or bar connected to one of said arms and acting to impart rotary and longitudinal movement to the coupling; and a driven lever or bar connected to the other arm.

10. Driving connections including a rotatable member longitudinally movable on its axis of rotation, driving means including a lever connected to said rotatable member and a crank for actuating said lever, whereby said rotatable member is turned about and moved longitudinally of its axis, and a driven member also connected to said rotatable member.

11. Driving connections including a rotatable member longitudinally movable on its axis of rotation, driving means connected to said rotatable member and whereby the latter is turned about and moved longitudinally of its axis, and a driven bar connected to said rotatable member and actuated thereby to move longitudinally and laterally.

12. Driving connections including a rotatable member longitudinally movable on its axis of rotation, driving means connected to said rotatable member and whereby the latter is turned about and moved longitudinally of its axis; and a driven lever connected to said rotatable member and actuated thereby to simultaneously move longitudinally on its fulcrum and rock or swing laterally on said fulcrum.

13. Driving connections including a coupling consisting of a member rotatable on an axis and also movable along said axis longitudinally of the latter, said coupling having two arms of different length branching therefrom in directions transverse to the axis of rotation, driving means connected to one of said arms and whereby the coupling is turned about and moved longitudinally of its axis, and a driven bar connected to the other arm of said coupling and actuated thereby to move longitudinally and laterally.

In testimony whereof I have signed this specification in the presence of two subscribing witnesses.

ARTHUR A. MERRITT.

Witnesses:
W. B. KERKAM,
F. A. HOLTON.

Copies of this patent may be obtained for five cents each, by addressing the "Commissioner of Patents, Washington, D. C."